Feb. 16, 1937.  G. F. MYERS  2,070,610
HELICOPTER
Original Filed July 29, 1931   5 Sheets-Sheet 1
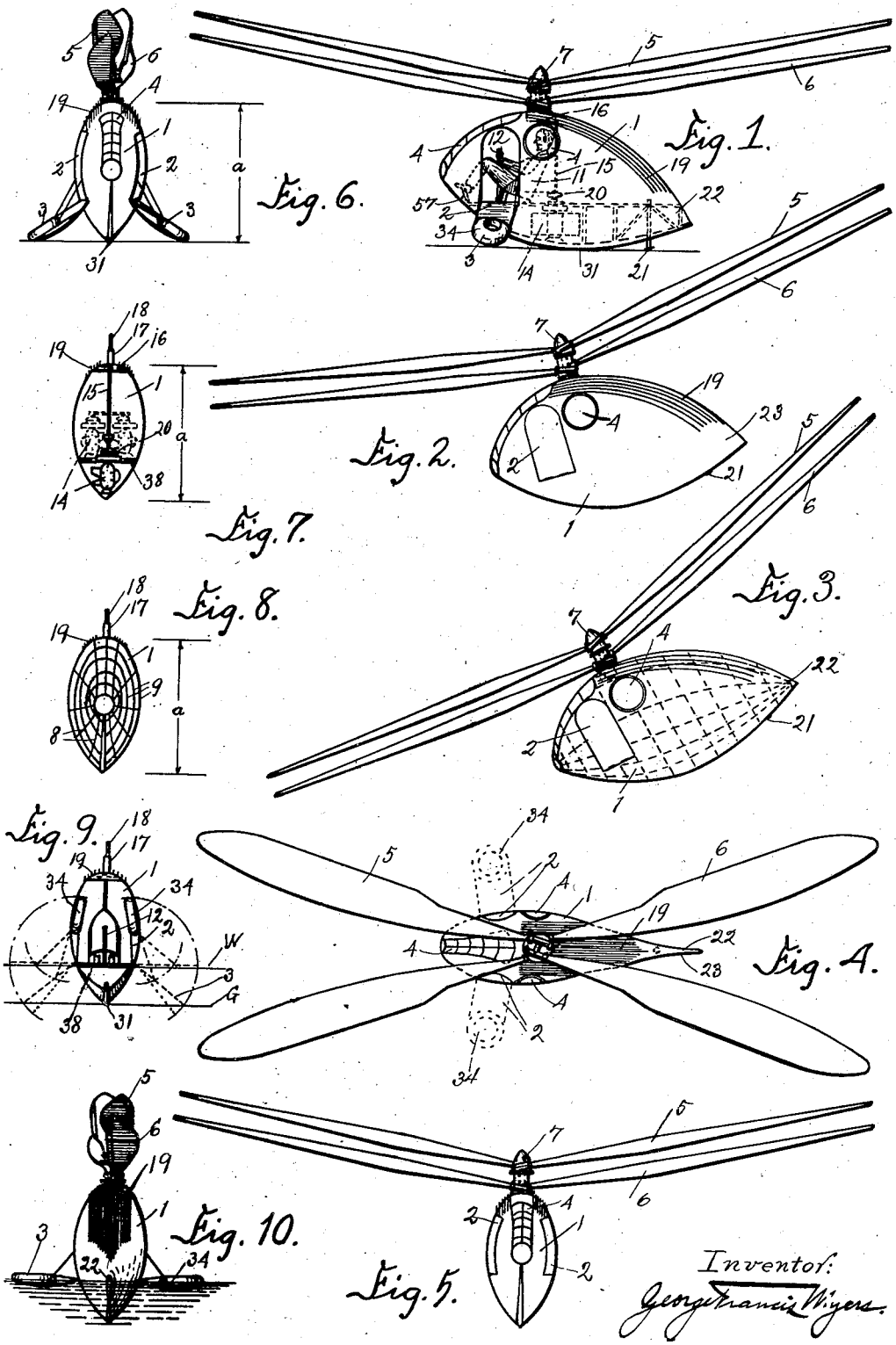

Feb. 16, 1937.   G. F. MYERS   2,070,610
HELICOPTER
Original Filed July 29, 1931   5 Sheets-Sheet 2

Inventor:
George Francis Myers

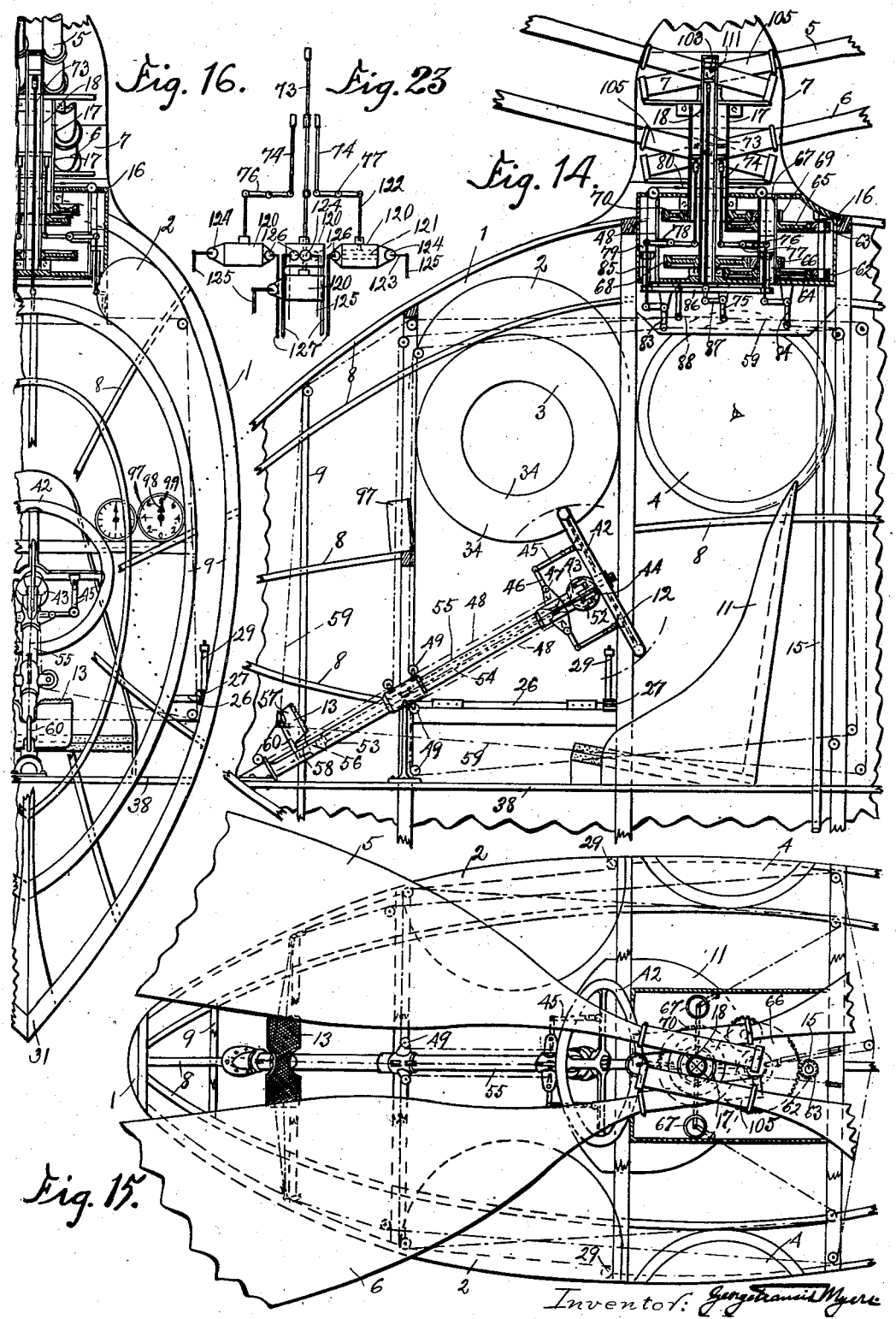

Feb. 16, 1937.　　　G. F. MYERS　　　2,070,610
HELICOPTER
Original Filed July 29, 1931　　5 Sheets-Sheet 4
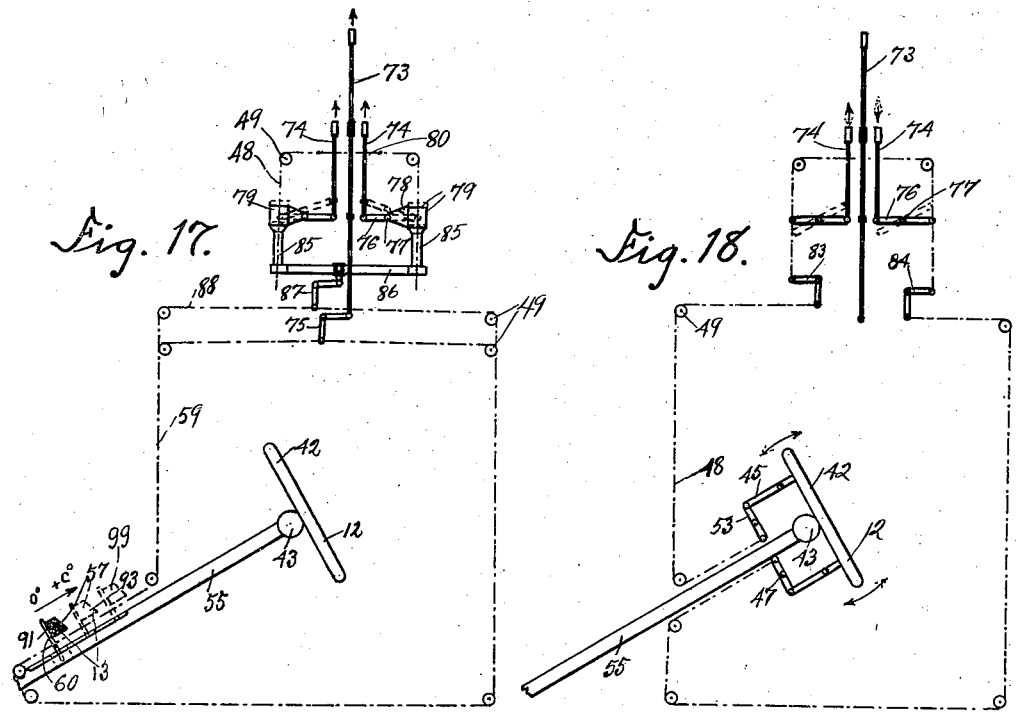
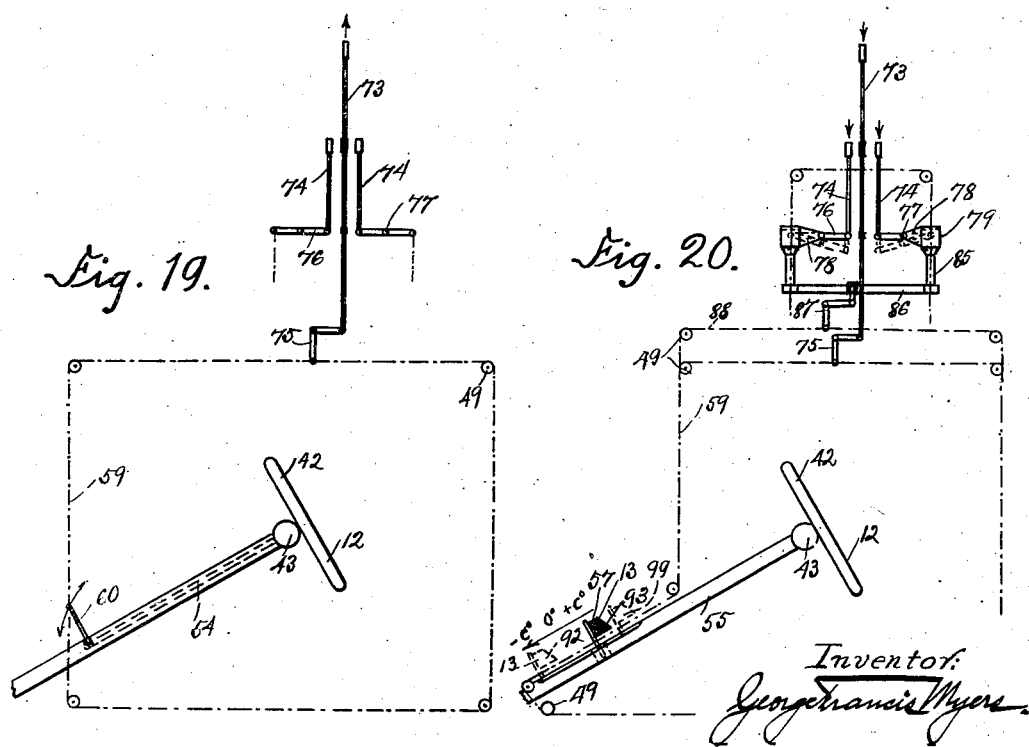
Inventor:
George Francis Myers Feb. 16, 1937.   G. F. MYERS   2,070,610
HELICOPTER
Original Filed July 29, 1931   5 Sheets-Sheet 5

Inventor:
George Francis Myers

Patented Feb. 16, 1937

2,070,610

UNITED STATES PATENT OFFICE 2,070,610

HELICOPTER

George Francis Myers, New York, N. Y.

Application July 29, 1931, Serial No. 553,795
Renewed November 26, 1934

10 Claims. (Cl. 244—17)

This invention relates to flying machines and particularly to that class thereof called helicopters.

It has for its object to produce a helicopter that will have a minimum of drag and great speed.

It also has for its object to produce a helicopter that is inherently stable and that has mechanism for stabilizing the machine and for bringing the machine to earth safely and slowly with power off.

Other objects and advantages of the present invention will be apparent from the following description, reference being had to the accompanying drawings wherein the preferred form of embodiment of the invention is clearly shown.

Figure 1 is a side elevation of the invention resting on the ground; Fig. 2 is a side elevation showing the machine flying through the air with the propeller shaft of the machine at a fifteen degree tilt; Fig. 3 is a similar view showing the propeller shaft of the machine tilted through an angle of 30 degrees, but the fuselage having substantially the same drag as at fifteen degrees or even at zero degree as in Fig. 1; Fig. 4 is a plan view of the machine; Fig. 5 is a front elevation of the machine; Fig. 6 is also a front elevation of the machine flying through the air with its landing gear extended as when standing on the ground; Fig 7 is a cross section through the power plant with the propellers removed; Fig. 8 shows the longerons and ribs; Fig. 9 is a section through the machine in front of the operator showing his seat and joystick, and the landing gear in its retracted position in full lines and diagrammatically in its outboard position; Fig. 10 is a rear view of the machine with the landing gear outstretched as when in the water.

Fig. 14 is a side elevation of a portion of the front part of the machine with one side of the cover thereof removed showing the interior. Fig. 15 is a plan view of the same. Fig. 16 is a front view of a portion of the same, the starting, stabilizing, steering and safety systems being operated by the change in the angle of attack of the blades.

Fig. 17 is a schematic view of the starting system. Fig. 18 is a similar view of the stabilizing system. Fig. 19 is a similar view of the steering system and Fig. 20 is a similar view of the safety system.

Figure 21:
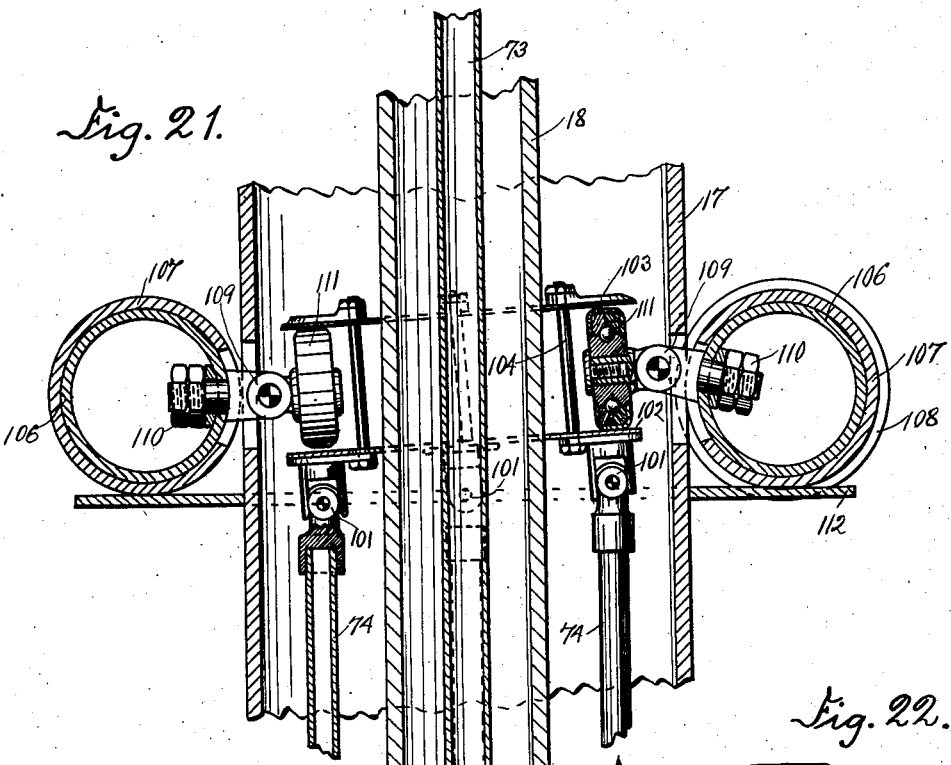
Figure 22:
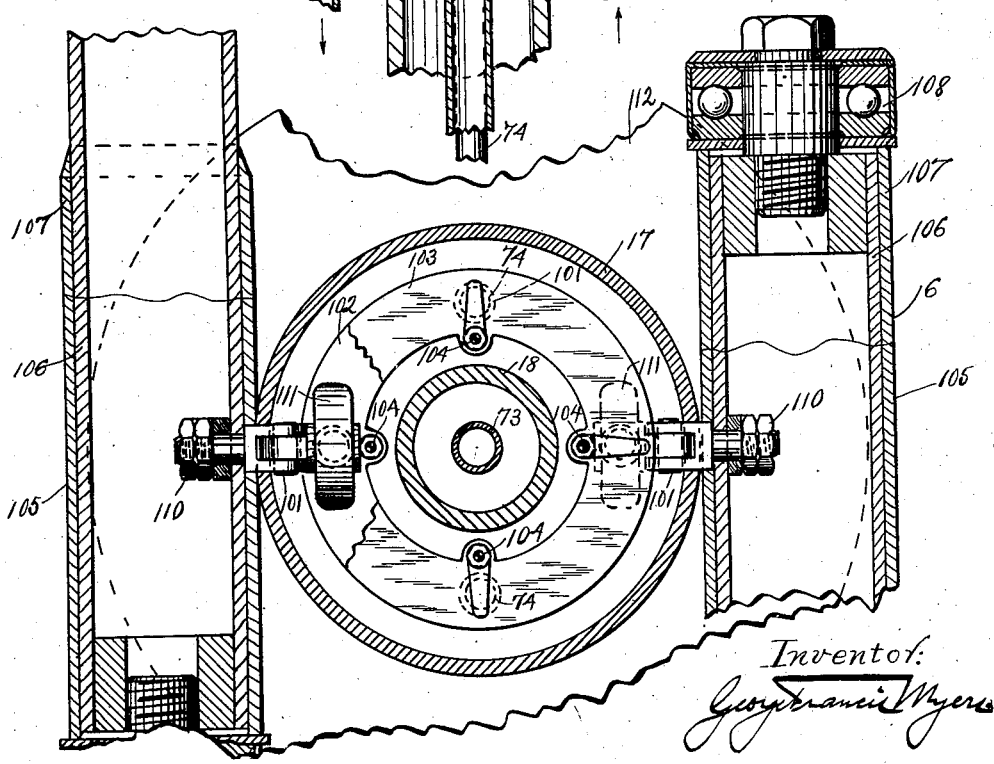

Fig. 21 is a fragmentary portion of the control systems partly in section on a larger scale than Fig. 15. Fig. 22 is a plan view thereof. Fig. 23 is a side elevation of the device, preferably pneumatic, for changing the angle of incidence of the blades of the propellers.

The invention is constructed and operated substantially and preferably as follows:

1 is the car or hull or fuselage or boat or the like, 2 the door, 3 the resilient landing device, 4 the windows, 5 and 6 the propellers, 7 the tower portion, 8 the longerons of the car, 9 the ribs thereof.

11 is the pilot's seat, 12 his hand control device, 13 his foot control device, 14 the engine, 15 the drive shaft, 16 the gear case, 17 the shaft of the lower propeller 6, 18 the shaft of the upper propeller 5, and 19 the exposed radiator tubes closely embracing the car. 21 is the tail skid or dashpot and 22 the tail forming a fin 23.

Figure 11:
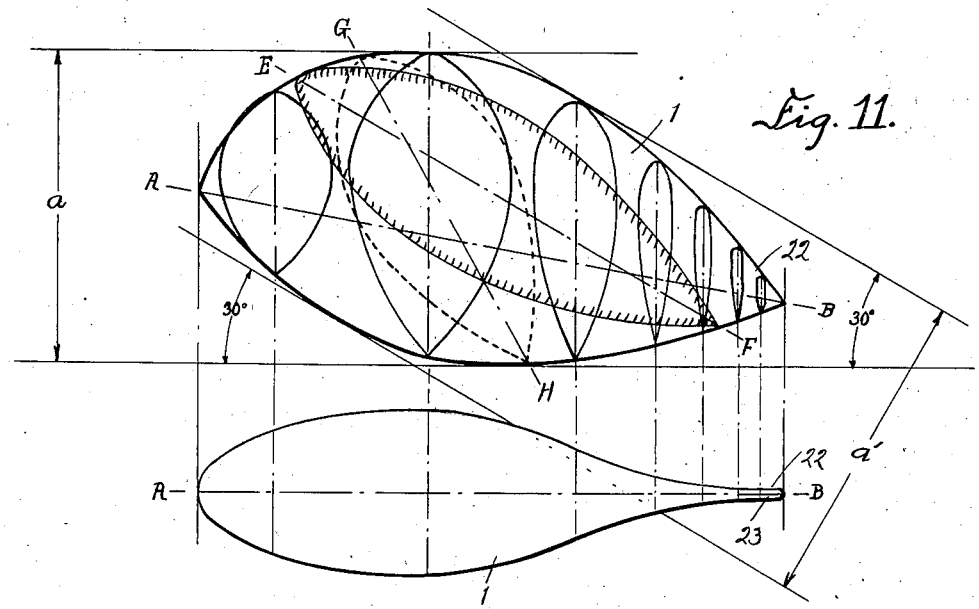
Fig. 11 is a diagrammatic side view of the fuselage showing why a minimum of drag is produced when the machine is traveling through the air either forward or upward, also that between zero and thirty degrees the forward drag is the same.

Referring more particularly to Fig. 11 the fuselage 1 is so shaped that no matter in which direction the machine is traveling normally—up or forward, or a combination thereof—it will present a form of least resistance, or in other words it is streamlined in every direction it will travel normally; as witness the streamlined section taken along the line A—B when at or near normal horizontal flight; or the section E—F or G—H when the machine is traveling both upward and forward. Also it will be seen that the height of the car as shown at $a$ is the same height as $a'$ when the machine is tilted over to thirty degrees; so that the drag of the car is no more at fifteen or thirty degrees than at zero or one degree tilt.

Figure 12:
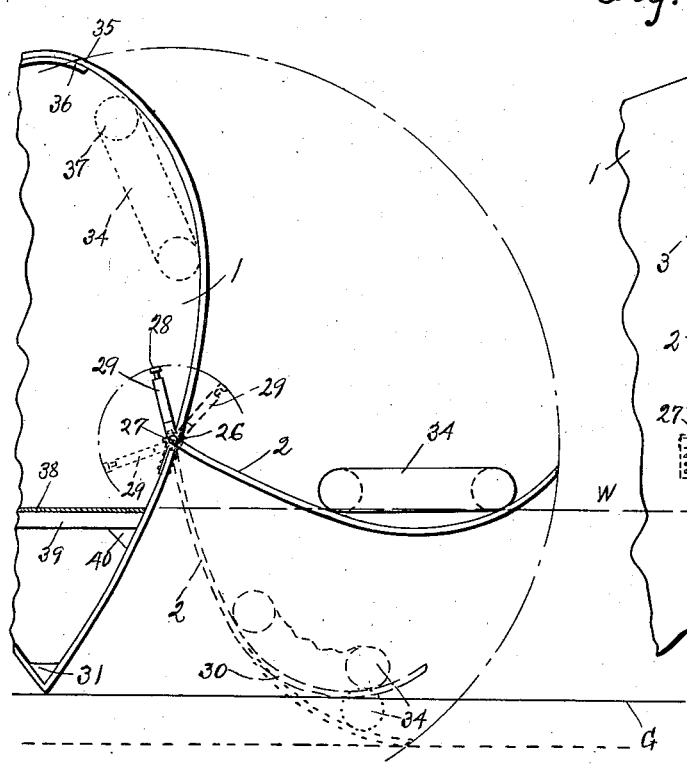
Fig. 12 is a front elevation of the landing gear on a larger scale, part of the fuselage being shown in section.
Figure 13:
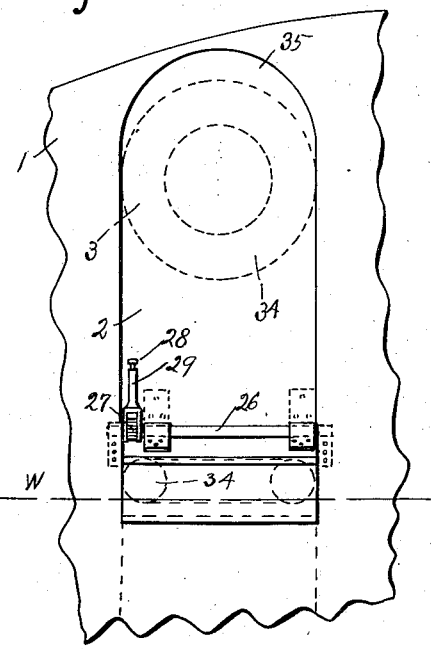
Fig. 13 is a side elevation of the landing gear and a portion of the fuselage.

Referring now more particularly to Figs. 12 and 13, the door 2 is hinged on the shaft 26 which has the ratchet wheel 27 thereon operated by the spring controlled catch 28 and handle 29. The door is made of laminated wood having a certain amount of springiness so that when it first strikes the ground G it will bend back as at 30 allowing the keel 31 of the car to settle on the ground easily and without shock.

When the door with its inflated inner tube 34 is lowered to its floating position as on the water W, the same will act as a float on each side of the machine and prevent the machine from tipping over. When the door is shut its upper end as 35 overlaps the portion 36 making a watertight joint, and the tube 34 will take the position shown in dotted lines as at 37. The flooring inside the car is shown at 38 held by transverse members 39 and corner pieces 40.

Referring now more particularly to Figs. 14-20 the above mentioned door 2 is seen from the inside with its tube 34, shaft 26 and handle or lever 29 conveniently placed near the seat 11 of the pilot. Immediately in front of the pilot is the manual control device 12 comprising the wheel 42, ball 43, the upper portion 44 of the ball and socket joint covering the upper part of the ball 43 and slidable thereon, but fastened to the wheel 42, ball 43, the upper portion 44 of the ball and an appreciable angle out of its plane of rotation and being fastened to 44, the latter will slide over or turn on the ball 43. This will allow the depressing of the connecting rods 45 and one end of the lever 46 on fulcrum 47 the inner end of the lever 46 operating the cord 48 running over pulleys 49 to the stabilizing system, controlling the manual means for transverse and longitudinal equilibrium as more particularly shown in Fig. 18.

The wheel (and the cup shaped member 44) can be moved out of its plane of rotation till the loosely fitting sections or abbreviated squares 52 contact and while this distance is quite limited it will be sufficient to operate the controls and turn the blades. If now the wheel be turned on its axis, these many sectors or squares will immediately engage one another turning the lower portion 53 with its sectors or squares and the ball and the long shaft or shank 54 in casing 55. At the lower end of 54 is the sliding member 56 having the upright pedal 57, composed of two transversely extending cheeks or wings the shaft 60 thereof being fastened into said sliding member 56 through a slot 58 in the casing 55. Cords 59 running over pulleys 49 reach to the starting system more particularly shown in Fig. 17, the steering system in Fig. 19 and the safety system in Fig. 20.

The engine 14 drives the shaft 15 passing through the gear box 16 and has two pinions 62 and 63 thereon, 62 meshing with 64 and 63 with 65. 64 in turn drives 66 turning with 64 on the hollow stationary shaft 67; 66 drives 68 on shaft 18, and 65 with 69 drive 70 on shaft 17.

Referring now more particularly to the control systems: 73 is the inner rod projecting up through the hollow shaft 18 and operates or throws the pins or the like that move or change the angle of incidence or attack of the blades of the propeller 5. 74 are the four shorter rods that operate the blades of the lower propeller 6. These rods move vertically inside of the shaft 17 which is of greater diameter than the shaft 18 but are shorter. The operation to change the angle of incidence of the said blades is shown more particularly in Figs. 21 and 22, but may be of any description for instance as shown in Figs. 10 and 11 of my application Ser. No. 574,777, filed August 1, 1910, or in Fig. 40 of my companion application Serial No. 514,338, filed November 10, 1921.

At the lower end of the long vertical rod 73 is the bell crank lever 75 operated by cord 59 from the foot board 57. Each of the four short vertical rods 74 are attached to a lever 76 turning on the fulcrum 77 on an extended arm 78 fastened to the cylindrical block 79 and moving in hollow tubes or shafts similar to 67 of which said shaft 67 is one. The inner end of said lever 76 moves up and down independently of the said cylindrical block 79, and has a cord 48 attached thereto running over pulleys 49 attached to a ring 80 of larger diameter than the shaft 17, encircling the same, and connecting with the diametrically opposite lever, one lever going up and the other down. This cord (or cords) extends vertically downwards and is attached to bell crank levers 83 and 84 working reversely. From here the cord runs down to pulleys 49 on the manual control, then alongside the same and is finally fastened to the inside of the wheel levers 46 controlled by the steering wheel 42 through links 45.

The cylindrical blocks 79 have depending hollow rods 85 attached thereto rigidly (through which the cord 48 passes) and all four of said rods are fixedly attached to the member 86 so that when the bell crank lever 87 is operated by the cord 88 all of the cylindrical blocks 79 will be moved vertically; and also the extension arm 78; and the fulcrum or pivot 77 of each block. But as the said cord 48 has not moved that portion of the lever 76 inside the tube 67 it will stay stationary and the inner end of the said lever will be moved up or down and the short vertical rods also, all simultaneously.

Referring now more particularly to Figs. 17 to 20 showing the control systems: Fig. 17 shows the starting system. The foot base or pedal 57 is at the start placed midway as at 91 between its lowermost 92, and uppermost 93, positions. When 57 is at the midway position the levers 76 are in the horizontal plane as shown in full lines, and both blades of the lower propeller 6 are horizontal or at a zero angle of incidence and when revolving would not create any lift. But as 57 is drawn up toward the wheel either way by a spring or by toe straps, the said levers are pushed up to the position shown in dotted lines by the movement of the bell crank lever 87, causing the blades to turn to a greater and greater angle of incidence. At the same time the bell crank lever 75 is also operated pushing up the rod 73 and bringing the blades of the upper propeller 5 from zero angle of incidence to a greater and greater angle. That is, both propellers have their blades brought to a greater and greater active position simultaneously as and when desired.

Fig. 18 shows the stabilizing system. When the top of the wheel 42 is pushed forward by the pilot in the chair 11 this will operate the links 45, lever 53 and cord 48, which will draw over the bell crank levers 83 and 84. This will bring the lever 76 to its position shown in dotted lines changing the angle of the blade to a more positive angle of incidence of whichever blade happens to be in its forward position in respect to the line of the fuselage and will depress the opposite lever 76 bringing the opposite blade of the propeller at a more negative angle of incidence. If the top of the wheel be moved toward the pilot this will tend to turn the blades reversely oppositely. When the wheel is deflected sideways the blades are reversely operated in a similar manner for transverse stabilization. In fact the blades are manipulated in practically the same way that ailerons and a fore and aft elevator are operated on an ordinary airplane, only here the shank of the steering wheel is fixed and only the wheel itself moves on a ball and socket joint.

Fig. 19 shows the steering system. When the steering wheel 42 is turned on its axis, the square shaped sectors or teeth of the members 43 and 44 instantly strike one another and turn the shank 54 and the sliding member 56 by means of a spline or the like so that the foot pedal 57 is turned in the slot 58. (It might be mentioned here that any movement of the wheel whether push pull or turn is very slight as the angle of the blades have to be changed only slightly to get results.) To the upper end of the central rod 60 of 57 are attached cords 59 which connect with the central operating rod 73 and changes the angle of both the blades of the upper propeller, while the blades of the lower propeller are not moved. This makes a differential between the two propellers, inducing a torque tending to turn the machine around on its axis either to the right or to the left, depending whether the angle of incidence of the upper propeller is greater or less than the angle of incidence of the lower propeller.

Fig. 20 shows the safety system. The operation is practically the same as in the starting system except that the pedal 57 is forced further down from zero to minus c, and turning the blades from their positive angle of incidence to a negative angle of incidence allowing the machine to come slowly and quietly to earth by windmill action.

One of the instruments 97 is geared to this pedal 57 by Bowden wire or otherwise so as to show by the dial in just what position the pedal is or rather at what degree of incidence the blades of the propellers are, whether at a zero or at a plus or at a minus degree.

As soon as the index hand 98 passes the zero mark on the instrument 97 it passes over a contact point 99 immediately cutting out the ignition and also throwing off the compression in the cylinders of the motor; one way of doing this being shown more particularly in Fig. 16 of my application Serial No. 543,010 filed March 11, 1922. This will allow the motor, shaft and gears to turn freely, and the whole power plant will revolve with the angle of incidence of the blades at a negative angle.

Instead of the electrical manipulation of the switch and compression devices, the same may be accomplished wholly mechanically by the pedal 57. In order now to give some resistance to the freely revolving blades the compression can be made greater or less by manual means if desired to give the needed resistance to the free turning of the propellers.

The pilot after seating himself, places his feet against the pedal 57 and brings the same to its middle or zero position which exact position is plainly knowable to him because of the turning of the indicator hand on his instrument to zero. The engine is now started and the blades will revolve idly, and in this condition the engine can be tested out to any degree of speed. When ready to ascend the pilot brings his feet toward his body by drawing up the pedal; this will increase the angle of incidence of the blades of both propellers and the machine will rise from the earth. If the machine is on the water at the start, the pilot pushes down on the righthand side of the wheel which periodically will give the blades on one side of the lower propeller a more positive angle of incidence and less positive angle of incidence on the other side tending to rock the machine one way. He now quickly pushes down the left hand side of the wheel which will rock the machine to the other side. By continuing this process of rocking (or a fore and aft rocking) the machine will be able to get free from the suction of the water and rise into the air. Of course on the ground there being no suction to keep him down he will not have to resort to rocking in order to get into the air.

As soon as he is free from the earth, he grasps the two handles 29 and draws them inwards closing the doors. If he now wishes to go forward he pushes the top portion of the wheel away from him which will turn the blade of the lower propeller to a more negative angle of incidence and the opposite blade to a more positive angle of incidence each time that these blades are in the fore or aft direction, but when the blades pass across the sides at the right and left they will remain normal.

If he wishes to stop going forward, he pulls the top portion of the wheel toward him which reverses the process just described and he comes to a level position; but continuing this process he may even fly backward.

When it is desired to turn to the right or left he turns the wheel around on its axis just the same as he would manipulate the steering wheel of an automobile. This increases the torque of the propellers one way or the other and turns the machine in the direction required. Only the angle of incidence of the top propeller need be changed, making it a little less or a little greater; although the angle of incidence of both the propellers may be changed, if desired.

If his engine stops, the pilot pushes the pedal down as far as possible which will reverse the angle of incidence of the blades. At the same time the compression of the engine cylinders will be released and all the mechanism will spin around. If now some resistance to the turning of the blades be required he can allow some compression to creep into the cylinders. By changing the position of the pedal the degree of the angle of incidence of the blades can be changed.

The mechanism for changing the angle of the blades of propeller 6 is shown more particularly in Figs. 21 and 22. At the upper ends of each of the four rods 74 is a commercial ball and socket joint 101 fastened to a lower annular plate 102 and above the same is the upper annular plate 103 with connectors 104 between the same. As any two of the rods 74 move up or down, the plates pivot on two of the joints 101.

Each of the blades of the propellers at its hub, as at 105, has an inner tube as 106 which pivots in an outer tube 107 and these two are connected by a thrust bearing 108 to take care of the centrifugal force. Where these tubes are contiguous to the outer shaft 107 is a hinge joint 109 one end of which is fastened to the inner tube by the nuts 110, while at the other end of 109 is the roller 111 made out of a commercial ball bearing. The distance between the two annular plates is made a trifle greater than the diameter of each of these two rollers, so that there will be practically no friction as they roll over the said plates, but they will be readily pushed up or down when one or more of the rods 74 is operated. As the rollers are pushed up or down they will turn the blades to a position of positive or negative angle of incidence. A plate 112 helps to hold the hubs 105 to the shaft 17.

It is a well known fact that a propeller in yaw is very inefficient and this is due to a great extent to the fact that if a propeller is at its best when its shaft is vertical it is at its worst when its shaft is placed obliquely. This is so because the angles of opposite blades (when the shaft is vertical) are the same, both being placed at the best and most efficient angle, which angle has been worked out carefully.

But as soon as the propeller is put in yaw, or the shaft is oblique, and there is forward motion, one of the blades begets a larger angle and the other a smaller angle due to these blades being turned through the arc of a circle whose radius is its shaft, and its center, the center of gravity of the machine. The blades were not designed to work at these unequal and distorted angles, and they become inefficient and nearly useless.

The ideal propeller would therefore be one in which the blades are at the correct angle of incidence, both when the propeller is working on a shaft that is vertical and also when in yaw. This is accomplished herein by having the blades of the propeller at their correct angle of incidence when the machine is ascending, and then gradually changing the blades to their correct angles of incidence as soon as forward motion is desired. that is when the shaft of the propeller is at an oblique angle to the horizon or in other words when the same is tilted or is in yaw. Practically this is done pneumatically as shown in Fig. 23, where the cylinders 120 have pistons 121 pushing and pulling the rods 122 attached to the upright rods 74 through 77. These as aforesaid operate to turn the shanks of the blades of the propeller (in the same general manner as shown herewith in connection with Figs. 14-16) when the cords or rods 125 connected to the foot pedal 57 operate the levers 123 of the valves 124. Pulling 57 further toward the operator than the position 93 as shown in Fig. 17 at 99 for instance, will bring the inclination of the blades to a still greater angle, so that as the tilt or yaw of the propellers increases the angle of incidence of the blades will increase making them more efficient than they would be if the original angle of incidence were kept.

The air supply tank, if the fluid actuating means be pneumatic pistons and cylinders, and its connections to the said valves are not shown, but any convenient or well known way may be used.

As my invention is in some of its aspects generic, I do not limit myself to the particular construction shown and described, but also contemplate the employment of such equivalents as fairly fall within the scope of the claims.

In this connection I may state that the upper propeller 5 may have four operating cords or pistons like the lower propeller 6 so that the angle of inclination of each of the blades thereof may also be changed periodically and reversely if desired. The change of the angle of inclination of the blades may be made to change automatically with the tilt of the propellers, as by a pendulum or gyroscope.

A new method of flying a helicopter is shown herein where the helicopter propeller is used both for lifting and for progression. Heretofore as soon as the propeller was yawed it seemed to lose its power and if put very much in yaw instead of going faster (which it naturally should do) it would go forward even more slowly. As aforesaid this is due in part to the fact that, when the helicopter propeller is in yaw and its blades are kept at the same angle of incidence as when the helicopter shaft was vertical, the impinging air strikes entirely on the top of the forwardly moving blade sending it down and backward instead of up and forward. In other words the drag was increased to such an extent that the horse power necessary just to drag the blade through the air was so great that there was nothing left over for lift, and the machine was soon grounded. But with the hereindescribed invention of always keeping a positive angle of incidence on the forward moving blade—that is, as soon as the propeller is in yaw changing the angle of incidence of the blade (the forward moving blade) from the natural negative angle it of necessity assumes to a positive angle, while placing the receding blade at a greater positive angle than it of necessity had there will be comparatively little drag and a sufficiency of lift, and the machine will fly forward fast.

This application contains subject matter shown in my companion applications, Serial No. 8,618 filed February 28, 1935, and Serial No. 76,589 filed April 27, 1936.

Therefore it should be understood that I may make various changes in the form, proportion, size and detail of the structures shown and described, the number and position of certain elements used, as well as the character of the motive power employed, without departing from the spirit of the invention.

I claim:

1. The combination in a flying machine, of an engine having compression, a fuel supply for the engine, a propeller having a plurality of blades driven by the engine, means for throwing off the compression in the engine, means comprising a throttle for controlling the fuel supply, means for turning the blades to different angles of incidence, and a unitary means for operating all of the three above mentioned means substantially simultaneously.

2. A flying machine as claimed in claim 1, in which a movable member operates all of the three means substantially simultaneously, by one movement thereof.

3. A flying machine as claimed in claim 1, in which a movable member operates all of the three means substantially simultaneously, by one movement thereof, and also admits compression into the engine for braking purposes.

4. A flying machine as claimed in claim 1, in which the engine is of the multi-cylinder type, and a movable member operates all of the mentioned means substantially simultaneously by one movement thereof, and also admits compression into the engine for braking purposes cylinder by cylinder.

5. The combination in a flying machine, of an engine having compression, a fuel supply for the engine, an ignition device, and a propeller having a plurality of blades driven by the engine; means for throwing off the compression, means comprising a throttle for controlling the fuel supply, means comprising a switch for operating the ignition device, and means for turning the blades to different angles of incidence; and a unitary means for operating all four of the above mentioned means substantially simultaneously.

6. A flying machine having an engine, a helicopter shaft driven by the engine, propeller blades mounted on the shaft, changeable pitch mechanism for the blades including fluid actuated pistons and cylinders, means for controlling said fluid cylinders for operating the changeable pitch mechanism, for tilting the helicopter shaft in relation to the vertical, and means for controlling said fluid cylinders for changing the angle of incidence of the blades in relation to the helicopter shaft.

7. A flying machine having an engine, a helicopter shaft driven by the engine, propeller blades mounted on the shaft, changeable pitch mechanism for the blades including fluid actuated pistons and cylinders, means for controlling said fluid cylinders for operating the changeable pitch mechanism, for tilting the helicopter shaft in relation to the vertical, and means for controlling said fluid cylinders for changing the angle of incidence of the blades in relation to the helicopter shaft practically simultaneously.

8. A flying machine having an engine, a helicopter shaft driven by the engine, propeller blades mounted on the shaft, changeable pitch mechanism for the blades including fluid actuated pistons and cylinders, means for controlling said fluid cylinders for operating the changeable pitch mechanism, for tilting the helicopter shaft in relation to the vertical, and means for controlling said fluid cylinders for changing the angle of incidence of the blades in relation to the helicopter shaft practically simultaneously in the same ratio.

9. A flying machine having an engine, a helicopter shaft driven by the engine, propeller blades mounted on the shaft, changeable pitch mechanism for the blades including fluid actuated pistons and cylinders, means for controlling said fluid cylinders for operating the changeable pitch mechanism, for changing the angle of incidence of the helicopter shaft, and means for controlling said fluid cylinders for simultaneously keeping the angle of incidence of the blades constant.

10. The combination in a flying machine, of an engine having compression, ignition means for the engine, a propeller having a plurality of pivotable blades driven by the engine, means for pivoting the blades from a positive angle of incidence to a negative angle, means for controlling the ignition means, and means for throwing off the compression in the engine, one of said means operating the others automatically.

GEORGE FRANCIS MYERS.